Figure 1:
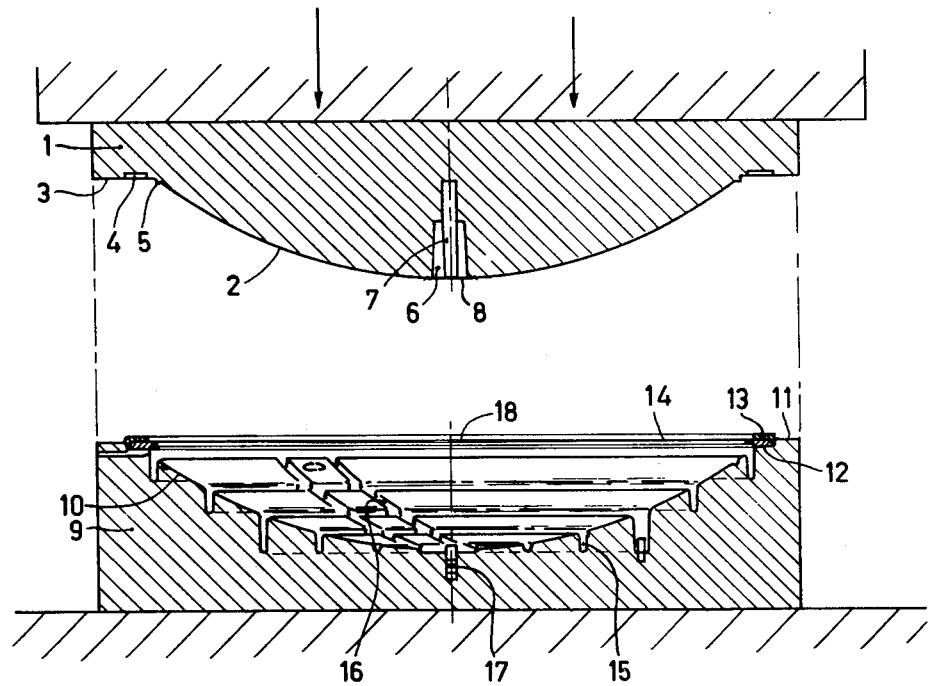

United States Patent [19]

Withoos

[11] 4,171,563
[45] Oct. 23, 1979

[54] METHOD OF MANUFACTURING AN ANTENNA REFLECTOR

[75] Inventor: Wilhelmus H. C. Withoos, Eindhoven, Netherlands

[73] Assignee: U.S. Philips Corporation, New York, N.Y.

[21] Appl. No.: 854,781

[22] Filed: Nov. 25, 1977

[30] Foreign Application Priority Data

May 20, 1977 [NL] Netherlands ............... 7705557

[51] Int. Cl.² ........................................ H01P 11/00
[52] U.S. Cl. .................................. 29/600; 29/527.4; 156/245; 264/299
[58] Field of Search ............... 29/600, 601, 527.4; 156/245; 425/129; 264/267, 268, 269, 299

[56] References Cited

U.S. PATENT DOCUMENTS

| 2,805,974 | 9/1957 | Brucker ............................. 29/600 |
| 2,858,603 | 11/1958 | Herrmann ........................... 72/46 |
| 3,125,801 | 3/1964 | Fields ............................... 425/129 |
| 3,296,685 | 1/1967 | Suliteanu .......................... 29/600 |
| 3,897,294 | 7/1975 | MacTurk .......................... 156/245 |

FOREIGN PATENT DOCUMENTS

538632  1/1956  Italy ........................................ 72/350

1371102 10/1974 United Kingdom ................. 425/129

*Primary Examiner*—Lowell A. Larson
*Attorney, Agent, or Firm*—Algy Tamoshunas

[57] ABSTRACT

The invention relates to the maufacture of reflectors of electromagnetic radiation, in which a flat and thin metal foil, for example an annealed copper foil which is clamped along its circumference is deformed plastically by means of a mould which has a convex surface. In the final position the mould with the deformed foil is at some distance from the surface of the matrix. The space between deformed foil and matrix is filled with a liquid synthetic resin, for example a foam-forming polyurethane resin. After complete or partial curing of the synthetic resin the mould is removed and the resulting assembly of deformed foil and synthetic resin layer connected thereto is removed from the matrix. In an interesting embodiment a matrix is used the concave surface of which has recesses so that in the finished reflector the supporting layer is provided with corresponding bosses, such as reinforcement ribs. In a further interesting embodiment a mould is used which has a central annular recess so that in the finished reflector in the optical center thereof a perforated hub is obtained which is of importance for aligning the reflector.

16 Claims, 5 Drawing Figures

METHOD OF MANUFACTURING AN ANTENNA REFLECTOR

The invention relates to a method of manufacturing an antenna reflector for the converging reflection of electromagnetic radiation in which a flat or a substantially flat metal plate clamped along its circumference is deformed by means of a press comprising a mould having a convex surface as well as a counter mould and the deformed plate is provided with a supporting member.

Such a method is known inter, alia, from U.S. Pat. No. 3,897,294. In this method, a flat copper plate or a flat plastic plate coated with a copper layer of a thickness of approximately 300–600$\mu$ is deformed in a press which consists of two parts. The upper half of the press has a convex surface and presses the flat plate against the concave surface of the lower mould half. In the final position the plate is clamped between both mould halves. The convex surface of the upper mould half and the concave surface of the lower mould half together determine the deformation of the plate. Therefore, the shape of both surfaces should be accurately matched to each other. The deformed plate is removed from the mould and transferred to a separate device (FIG. 13 of the patent cited above) to provide a supporting member for the plate. For this purpose, the deformed plate is positioned over the concave surface of a mould and is then provided with an upright cylindrical collar which at its free end is closed by a rear plate. The assembly of collar and rear plate is surrounded by a housing which is built up from segments. The space enclosed by deformed plate, collar and rear plate is filled with polyurethane foam after which the segmented housing as well as the mould are removed. The resulting reflector has a sandwich structure consisting of comparatively stiff outer layers with a core of synthetic foam therebetween.

This known method requires many operations and treatments and is therefore less suitable for mass production of reflectors. The method is also rather expensive and has the further drawback that as a result of the displacement of a unsupported deformed plate or foil, variations in shape may occur which may give rise to the formation of cracks and tears in the deformed plate.

Published French patent application No. 7202433 discloses another method of manufacturing a reflector in which a metal plate is provided over a convex lower mould (FIG. 1). At some distance therefrom a second metal plate is provided concentrically with the first. Between the two concentric plates and along the whole circumference thereof an annular edge part of U-profile is provided and a liquid synthetic resin, for example a polyurethane foam, is then poured into the space enclosed by the plates and the edge part. The required supports for securing the reflector to a support structure are provided on the surface of the rear plate. The reflector manufactured according to this method has a sandwich structure in which a core of synthetic resin is disposed between two relatively stiff outer layers.

The method according to the French patent application is not readily suitable for mass production. The method is further rather expensive and laborious because two plates have to be profiled accurately and furthermore have to be positioned accurately with respect to each other. The aftertreatment to obtain the necessary mounting points also means a considerable and hence expensive extension of the process time.

The present invention relates to a method of manufacturing a reflector without the above-mentioned disadvantages.

The invention relates in particular, to a method of the kind mentioned in the preamble and is characterized in that a metal foil of a thickness of 10–100$\mu$ is plastically deformed by the mould, the deformation of the foil being determined solely by the convex surface of the mould. The deformed foil in its final position is at some distance from the surface of the opposite mould which is constructed as a matrix. The space between the deformed foil and the surface of the matrix is filled with a liquid synthetic resin and after complete or partial curing of the resin, the resulting assembly of deformed foil and layer of synthetic resin affixed thereto is removed from the matrix.

The method according to the invention is particularly suitable for mass production of reflectors and provides a reflector having an excellent reflecting surface and, therefore, good electrical properties.

The reflector obtained by means of the method according to the invention is light-weight and mechanically strong. In addition, the method according to the invention is a one-step-process in which the whole reflector can be manufactured in one continuous operation. In addition, the method of the invention also makes it possible to provide during the one-step operation, on the rear side of the reflector, that is the surface remote from the metal foil, the required reinforcement, ribs and mounting points or ribs, for securing it to a supporting structure.

The above-described metal foil is of significant importance to obtain good results. In effecting the invention, it has been found that a great difference exists between the above-mentioned foil and a plastic foil which is frequently described in literature and which has a metal layer on one or two sides. In particular, it has been found that the metal layer of such a plastic foil will very easily crack and tear upon deformation. This does not apply to the metal foil used in the method according to the invention. This difference which is so essential for the manufacture of reflectors is, in applicants' opinion, caused by the coherence in the metal foil which, due to the crystalline structure, is much larger than in the metal layer which is provided on the substrate, for example, by means of a vapour deposition, spraying or growing process.

The above-described flat foil, which is clamped along its circumference, is deformed only by the mould, having a very accurately defined vaulted surface, for example, a parabolic surface, without any pleats or cracks. In designing the foil, the matrix does not play any part and is used merely to obtain a closed space which is filled with the liquid synthetic resin between the deformed foil and the matrix. Since the matrix does not play a part in the deformation of the foil, the shape of the matrix surface is absolutely independent of that of the mould. This makes it possible to provide any desired shape for the supporting layer.

An example of a metal foil used in the method according to the invention is an aluminum foil.

Also very suitable is an annealed copper foil having a thickness of 20–50$\mu$. Such a foil can be subjected without difficulty to a considerable plastic deformation, for example, a plastic deformation of a flat circular copper foil having a diameter of 2 m to a parabolic surface.

Furthermore, such a copper foil has both a favourable elastic and thermal shrinkage behaviour which is of importance during curing of the liquid synthetic resin provided between the deformed foil and the matrix.

In order to promote adhesion between the metal foil and the synthetic resin, the foil may be provided with an adhesive, for example, a two-component adhesive. Excellent adhesion is obtained when the surface of the foil facing the moulding resin has a rough surface which can be obtained in a simple and effective manner by means of a chemical etching process.

The synthetic resin used in the method according to the invention preferably is a foam-forming synthetic resin resulting in a reflector having a very low weight.

In a further favourable embodiment of the method according to the invention, a foam-forming polyurethane resin is used. The polyurethane foam adheres very readily to the roughened surface of the metal foil. Surprisingly, the combination of a very thin metal foil with a supporting layer of polyurethane foam produces a very rigid and mechanically strong reflector.

The polyurethane foam is particularly suitable for use in combination with the above-mentioned copper foil. The shrinkage of the polyurethane foam as a result of curing at higher temperatures and the subsequent cooling to room temperature are very readily compensated by the elastic and thermal shrinkage of the copper foil. This may be explained with reference to a practical example. As a result of curing at a temperature of approximately 180° C. and the subsequent cooling to room temperature, a shrinkage of approximately 0.65% takes place in polyurethane foam. The deformed copper foil shows an elastic shrinkage of 0.2% and a thermal shrinkage of 0.25% upon cooling from 180° C. to room temperature. The difference in shrinkage between polyurethane foam and copper foil is 0.2%. The pressure exerted on the copper foil as a result of this difference is approximately 1% of the stress at which the copper foil deforms plastically. Such a low pressure can be taken permanently by the copper foil without any problem and, hence, without any further deformation.

In a preferred embodiment of the method according to the invention, a matrix is used having a concave curved surface which corresponds to the convex surface of the mould.

The layer of synthetic resin introduced between the matrix and the deformed foil has the same thickness throughout the dimensions of the reflector so that of thermal shrinkage and shrinkage as a result of the hardening, the stresses in the layer of synthetic resin are the same everywhere.

In a further favourable embodiment of the method according to the invention, a matrix is used whose surface is provided with recesses or grooves. The supporting layer in the finished reflector is thus provided with bosses or ribs on the side remote from the foil corresponding to the recesses or grooves.

As previously stated previously, the reflector may be provided in this simple manner with reinforcement ribs or assembly strips for securing it to a supporting structure.

The starting material in the process at the invention is a metal foil which is clamped along its circumference, that is to say at its edge. The foil may be clamped in the usual manner, for example, between an assembly of two annular elements which are pressed together, for example, by means of bolts. The assembly of annular elements may be mounted, for example, so as to be detachable in an annular recess in a flat edge part at the end face of the matrix. The flat foil clamped between the annular elements then extends over the concave surface of the matrix.

In a favourable embodiment of the method according to the invention the mould has a clamping ring as claimed in claim 8.

In carrying out this method, as the mould, with the clamping ring attached thereto, is moved in the direction of the matrix, the clamping ring impacts against the flat edge portion of a foil drawn flat over the matrix. This flat edge portion of the foil is supported by a flat edge part of the matrix.

As the mould is moved further, the resiliently or telescopically movable elements will be depressed so that the distance between the mould and the foil is reduced and deformation of the foil takes place until the supports are fully depressed. In this final position, the deformed foil is at some distance from the concave surface of the matrix. A liquid synthetic resin, for example, the above-mentioned polyurethane resin, is then injected into the space between the foil and the concave surface of the matrix and is cured at elevated temperature. The mould together with the clamping ring is then withdrawn, so that the resulting reflector can be detached from the matrix. Finally, the flat edge part of the foil not provided with a supporting layer is removed by clipping it off.

A further favourable embodiment of the method according to the invention uses a mould whose edge portion has a circular boss or ridge.

With this arrangement upon deformation of the metal foil and also upon injection of the synthetic resin, a circular groove is pressed into the foil surface. The foil can easily be cut along this groove so that the part of the foil not provided with a supporting layer can be removed. An additional advantage is that during cutting the foil edge is bent in the direction of the supporting layer thereby minimizing the possibility of tearing of the foil edge or the formation of a milled foil edge during subsequent handling of the reflector.

Another embodiment of the method according to the invention uses a metal foil having a central aperture and a mould with a recess having a substantial circular cross-section in its central surface portion. Provided in the recess is a central pin which is secured to the mould. The diameter of the pin is smaller than that of the aperture in the metal foil and, after deformation of the foil by the mould, the central pin engages the surface of the mould through the aperture in the metal foil. When the liquid synthetic resin is injected between the deformed foil and the surface of the matrix, through the aperture in the foil, the space between the central pin and the walls of the recess is also filled with liquid synthetic resin. After the mould with central pin is removed and detached from the matrix, the resulting reflector has a central aperture which extends into a hub obtained on the side of the copper foil.

The aperture in the reflector and in the hub is used to align the reflector elegantly and efficaciously. For this purpose, it should be noted that the reflected radiation is received at the focus of the reflector, for example, at the focus of a parabolic reflector and is then processed in an antenna horn. Alignment of the reflector is to be understood to mean herein, the accurate positioning of the horn or another instrument for processing the electromagnetic radiation at the focus of the reflector. The above-mentioned aperture in the reflector and hub forms a guide channel for positioning the horn at the focus along the optical axis of the reflector. Such positioning, for example, may be carried out optically by receiving a light ray, via the channel and bounded by the channel, by a photosensitive element connected to the horn. The element may, for example, be a photo cell arranged at the computed focal point of the reflector. With optimum illumination of the photocell, the horn and cell will be aligned with the optical axis of the reflector and the horn may then be fixed at the focus thus determined.

The focus may also be determined mechanically and the horn positioned at the focus. For this purpose, a directing or alignment rod is inserted through the aperture. The rod is provided with a mark indicating the computed focal distance.

The rod extends through the aperture along the optical axis of the reflector so that when the mark is aligned with the reflective surface of the reflector formed by the copper foil, the end of the rod is exactly at the focus.

The aperture in the reflector and the hub is determined during the manufacture of the reflector by the outer surface of the central pin secured to the mould.

In a further embodiment of the method according to the invention, at least one generatrix of the surface of the central pin is parallel to the optical axis of the resulting reflector.

The remaining surface portions of the pin need not be parallel to the optical axis but may have, for example, a conical variation which facilitates the detachment of the pin from the injected, cured synthetic resin.

Another favourable embodiment of the method according to the invention is characterized in that the centre of the matrix has a boss or abutment which, at the end remote from the matrix, has a mainly circular, apertured pressure plate whose diameter is larger than the diameter of the aperture in the metal foil. After deformation of the foil by the mould the central pin in the mould, engages the central part of the pressure plate connected to the boss and, furthermore, the edge of the pressure plate presses the part of the foil adjoining the aperture in the metal foil against the mould. When the space between the deformed foil and the matrix surface is filled with liquid synthetic resin, the space between the central pin and the walls of the recess in the mould is also filled with the resin through the apertures in the pressure plate.

With this arrangement during injection moulding, no synthetic resin can land between the mould and the part of the foil which is firmly clamped against the mould by means of the pressure plate and which adjoins the aperture in the foil.

According to still another embodiment of the method according to the present invention, a detachable annular element is provided in the recess of the mould at some distance around the central pin. The inner surface of this element has a longitudinally extending slot with a detachable insert having an aperture positioned in the slot. During removal of the mould, after the copper foil has been deformed and the space between the foil and matrix is filled with the liquid synthetic resin, the annular element is removed together with the mould.

The insert is thus not removed and remains on the outer surface of the hub after removal of the mould. A hole can be drilled in the wall of the hub via the aperture in the insert and then, possibly after removal of the insert, a clamping bolt, for example, may be provided through the hole. With this bolt the directing rod is pressed against that portion of the inner wall of the hub which is parallel to the optical axis of the reflector.

In a further favourable embodiment a screw with sheath is provided in the aperture of the insert so as to extend up to the central pin in the recess. After injecting the resin in the space between the foil and matrix, in which thus the hub is also formed, the mould is removed. As stated above, the insert is on the wall of the hub. The screw is then removed exposing an aperture in the wall of the hub surrounded by the sheath. The insert may now be removed from the wall of the hub and, by means of a screw provided in the aperture, the directing rod may be pressed against the inner wall of the hub and fixed in this manner. The shape of the reflectors according to the invention is very accurate. With a reflector diameter of approximately 1 m, the surface accuracy, calculated according to the "root mean square" method, is smaller than 0.3 mm. The "root mean square" method is based on the formula $$\epsilon_{rms} = \sqrt{\epsilon_n (x_i - x)^2/(n-1)}$$

n being the overall number of measurements, $x_1$ the measured values, and x the theoretical value.

The efficiency of a reflector at a frequency of 12 GHz is higher than 97%. The energy loss at 12 GHz is only 0.1 dB. At 30 dB the efficiency of the reflector is 85% and the energy loss is 0.7 dB. The reflector manufactured according to the invention is even suitable for use at frequencies of 50 GHz, at which the efficiency is 68% and the loss of energy only 1.7 dB.

Figure 2:
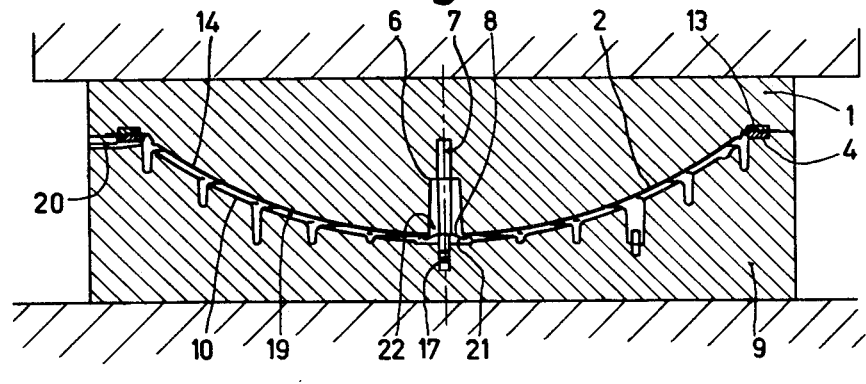
Figure 5:
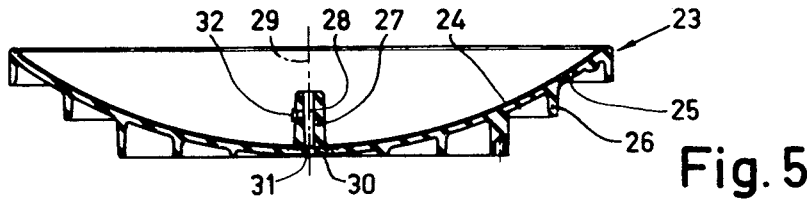
Figure 3:
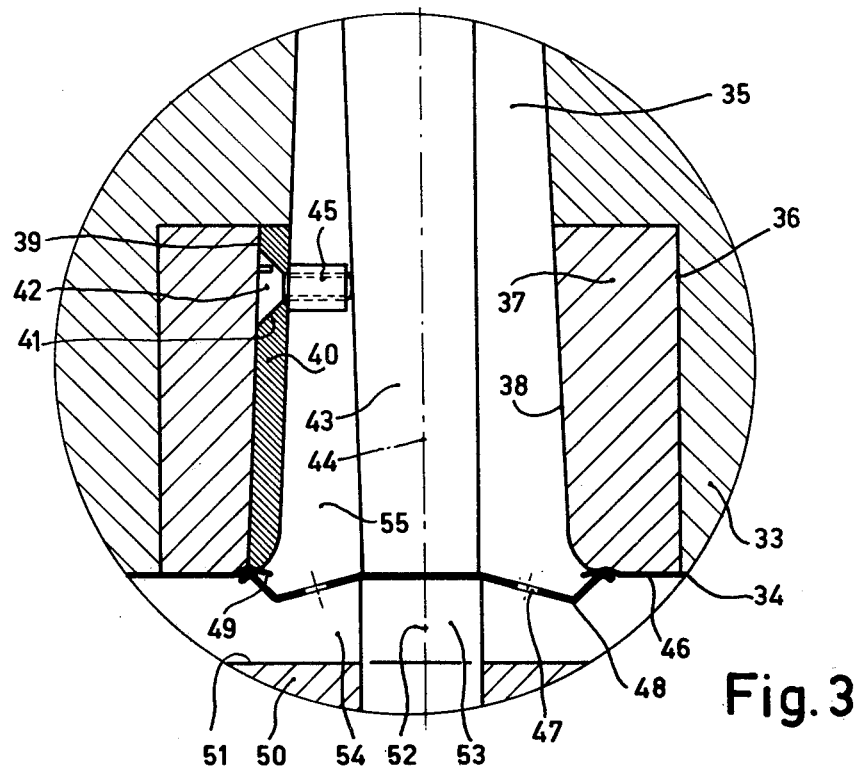
Figure 4:
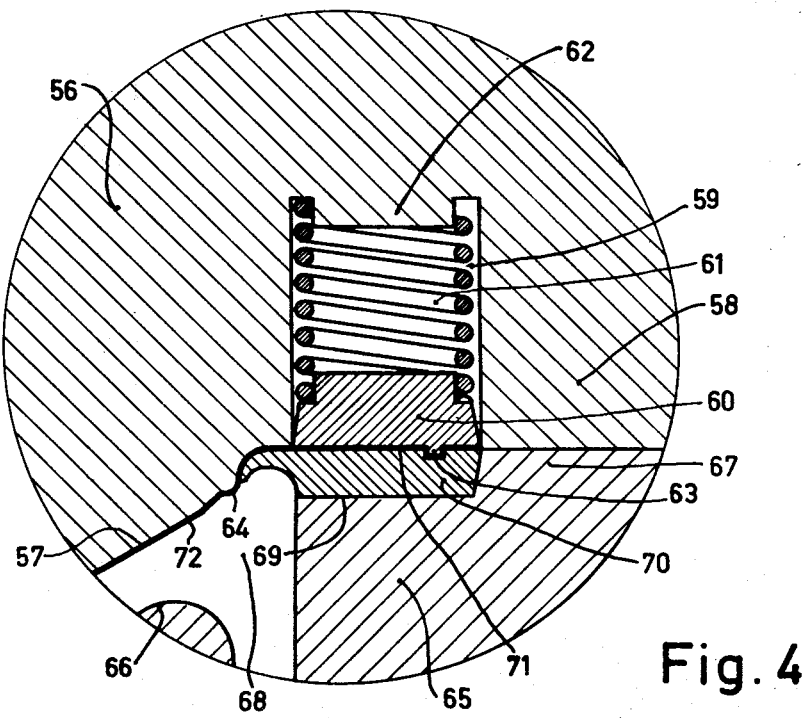

The invention will now be described in greater detail with reference to the drawings, in which FIG. 1 is a cross-sectional view of a mould and matrix used in the method of the invention, in which the foil is not yet deformed, FIG. 2 is a cross-sectional view of mould and matrix with liquid synthetic resin injected between the matrix and the deformed foil, FIG. 3 is a cross-sectional view of a detail of the mould, FIG. 4 is a cross-sectional view of another detail of mould and matrix, FIG. 5 is a cross-sectional view of a reflector obtained according to the invention.

As shown in FIG. 1 a mould or die 1 is moved in the direction denoted by an arrow. The mould is made, for example, from steel or from epoxy-clad concrete and has a convex parabolic surface 2. A flat edge portion 3 of the mould has an annular groove 4.

The parabolic surface also has an annular ridge 5. In the center of the parabolic surface 2 there is a recess 6 in which a central pin 7 is positioned which is made, for example, from steel and is attached to the mould 1. Pin 7 has a conical surface and is arranged so that a generatrix, in FIG. 1 the right-hand wall portion of pin 7, extends parallel to the parabola axis of the parabolic surface 2 denoted by broken lines. The end face of pin 7 has a pressure plate 8 as will be explained with reference to detail in FIG. 3.

The matrix 9, which is also made from steel or epoxy concrete, has a concave parabolic surface 10 which corresponds to parabolic surface 2 of mould 1. A flat edge portion 11 of matrix 9 has an annular groove 12 in which is disposed a set of rings 13. A flat copper foil 14 is clamped between the rings 13. The parabolic surface 10 has a number of recesses or grooves 15 in the form of concentric channels. Radial recesses 16 are also provided. A steel pin 17 is provided in the centre of and projects beyond the parabolic surface 10. It is to be noted that pressure plate 8 need not be attached to the pin 7 but may instead be attached to the steel pin 17. Foil 14 has a central aperture 18 the diameter of which corresponds to that of recess 6.

During the movement of the mould in the direction shown by the arrows, the copper foil 14 will be deformed plastically and in the final position it will entirely engage the parabolic surface 2 of the mould 1. In the final position shown in FIG. 2, the upper ring of the set of rings 13 is seated in groove 4 of mould 1 and pin 7 with pressure plate 8 engages the end face of pin 7. There is a space 19 between the deformed foil 14 and the parabolic surface 10 of matrix 9. The width of space 19 corresponds to the distance over which pin 17 projects above the surface 10.

When pressure plate 8 engages pin 17 it will be deformed, the clamping edge of pressure plate 8 pressing the portion of foil 14 disposed around aperture 18 against the parabolic surface 2 of mould 1, as will be explained hereinafter with reference to the description of FIG. 3.

Space 19 is then filled by injection moulding with foam-forming polyurethane resin via a supply duct 20 in the matrix. The liquid urethane resin flows via apertures 21 in pressure plate 8 and into the annular space 22 between pin 7 and the wall parts of recess 6. Upon filling with urethane resin the foil 14 will be pressed firmly against the surfaces of the mould 1 and an annular fold or cut will be pressed in the foil surface by ridge 5 of mould 1. After the polyurethane resin is foamed and cured at 170° C., the mould is removed, the copper foil is cut loose along the above-mentioned fold and the resulting reflector shown in FIG. 5 is detached from the matrix.

Reference numeral 23 in FIG. 5 denotes a reflector which has a parabolically curved copper foil 24 and a supporting layer 25 of polyurethane foam attached thereto. Supporting layer 25 has concentric reinforcement ribs 26.

In the center of the reflector and secured thereto is a hub 27 which extends at right angles to the parabolic surface of the reflector. The hub has a central aperture 28 which extends along the optical axis of the reflector. Aperture 28 of hub 27 communicates, via an aperture in pressure plate 30, with an aperture 31 in the reflector wall. The inner surface of hub 27 is conical and has a generatrix, in FIG. 5 the right-hand wall portion of hub 27, which extends strictly parallel to the optical axis 29. During alignment of the reflector as, described earlier, a rod (not shown) provided with a mark is inserted through apertures 28, 31. The rod can be pressed against the right-hand inner surface of hub 27 by means of a clamping bolt 32 in the left-hand wall portion of hub 27. The rod extends along the optical axis so that the focus can be determined from the focal distance denoted by a mark on the rod.

FIG. 3 shows a detail of an advantageous embodiment of the mould. It is a modified embodiment of the central part of the mould with the recess showing the mould when it has reached the extreme position with respect to the matrix.

Reference numeral 33 in FIG. 3 denotes a mould having a parabolic surface 34. The mould 33 has a conical recess 35 whose width increases towards the parabolic surface 34. An annular element 37 having a substantially conical inner surface 38 is positioned in an annular opening 36.

The annular element 37 has a groove 39 in which is positioned an insert 40. The insert has an aperture 41 provided with a screw 42. Screw 42 extends in recess 35 up to a steel pin 43 positioned centrally in recesses 35, 36 and attached to the mould. Steel pin 43 is conical and is positioned so that a generatrix (on the right side in FIG. 3) extends parallel to the parabola axis 44. Screw 42 has a sheath 45 provided with internal screw-thread.

A copper foil 46, which has a central aperture with a diameter between that of the inner surface and that of the outer surface of annular element 37 abuts against the parabolic surface 34 of mould 33.

Steel pin 43 has a pressure plate 48 at its end face. Plate 48 is provided with apertures 47 and a circular clamping edge 49 which presses the foil 46 against the parabolic surface 34.

Matrix 50 has a concave parabolic surface 51 which is provided centrally, that is to say at the area where the optical axis 52 intersects the parabolic surface 51, with a steel pin 53 whose diameter is slightly larger than that of steel pin 43. In the final position of mould 33, the end face of pin 53 engages the central part of pressure plate 48. When pin 43 with pressure plate 48 engages pin 53, pressure plate 48 is deformed so that the clamping edge 49 is firmly pressed against the foil 46.

When the space 54 between mould 33 and matrix 50 is filled with polyurethane resin, the annular space 55 between annular element 37 and steel pin 43 is also filled via apertures 47 in pressure plate 48. After the resin is foamed and cured, the mould 33 with steel pin 42 and inserting element 37 is removed. Insert 40 remains behind when the mould is removed and can be removed after unscrewing screw 42.

The resulting reflector is detached from the mould and corresponds to the reflector shown in FIG. 5. The sheath 45 (not shown in FIG. 5) is present in the left-hand wall part of hub 27 (FIG. 5) upon detachment of the reflector from the mould.

FIG. 4 is a sectional view of another embodiment of a clamping construction for the copper foil.

Reference numeral 56 in FIG. 4 denotes a mould which has a parabolic surface 57 as well as a flat edge portion 58. Provided in the flat edge portion 58 is an annular recess 59 with an annular pressure element 60 made from aluminum positioned therein. Element 60 is attached to a cam 62 of mould 56 by means of a spring 61. The annular pressure element 60 has a ridge 63. The parabolic surface has an annular boss or rib 64.

Matrix 65 has a parabolic surface 66, as well as a flat edge portion 67. At the boundary of parabolic surface and the flat edge portion, the matrix has a recess or groove 68. The flat edge portion 67 of the matrix 65 has a recess 69 in which is positioned an aluminum clamping ring 70. Element 60, which is under spring pressure, presses against a flat edge portion 71 of a copper foil 72 deformed over the parabolic surface of the mould and rigidly clamps it against the clamping ring 70. Ridge 63 of element 60 promotes the clamping. In the final position of the mould 56 with respect to matrix 65 shown in FIG. 4, the pressure element exerts maximum pressure and is seated within the recess 59. In the initial position of the mould 56 (not shown), spring 61 is relaxed and extends to a point beyond the parabolic surface 57 of mould 56. When the mould 56 is moved with respect to the matrix 65, element 60 presses the edge part 71 of the foil 72, extending smoothly over the matrix against clamping ring 70 before the foil starts to be deformed by the mould. Upon further movement of the mould 56 in the direction of the matrix, the foil clamped in this manner will be deformed and upon further deformation, the clamping of the foil will be intensified by the increased pressure exerted by the spring 61.

What is claimed is:

1. A method of making an antenna reflector comprising the steps of positioning a metal sheet between a die having a convex surface and a mould spaced from said die and having a cavity adapted to receive said convex surface with a gap therebetween, clamping said sheet at the periphery thereof, moving said die towards said mould and into engagement with said sheet to plastically deform and impart to said sheet a shape corresponding to the shape of said convex surface, said deformation of said sheet being effected solely by said convex surface of said die, arresting the movement of said die at a position such that said convex surface and the deformed sheet are spaced from the wall of said cavity, injecting a liquid synthetic resin into the space defined by said deformed sheet and said wall of said cavity, curing said resin to form a support member for said deformed sheet, withdrawing said die and removing said sheet and said support member attached thereto from said mould.

2. The method according to claim 1 wherein said sheet is between 10 and 100μ thick.

3. The method according to claim 2 wherein said sheet is annealed copper and has a thickness between 20 and 50μ.

4. The method according to claim 1 wherein said resin is foam-forming.

5. The method according to claim 4 wherein said resin is thermo-curing polyurethane.

6. The method according to claim 1 wherein said cavity is concave and corresponds to said convex surface of said die.

7. The method according to claim 1 wherein the wall of said cavity has recesses or ridges to thereby form, in the finished reflector, corresponding ribs or indentations in the side of said support member remote from said sheet.

8. The method according to claim 1 wherein said mould has a flat peripheral portion, said sheet is positioned so that an edge portion thereof is supported by said peripheral portion, and said step of clamping includes the step of resiliently pressing a ring disposed about the periphery of said convex surface against said edge portion supported by said peripheral portion prior to deformation of said sheet.

9. The method according to claim 8 wherein said ring is pressed by a resilient element secured to said die.

10. The method according to claim 1 wherein said die has an annular ridge extending about the periphery of said convex surface for imparting an annular groove at the periphery of said sheet during deformation.

11. A method of making the antenna reflector comprising the steps of positioning a metal sheet having a thickness of 10 to 100μ and an aperture formed in the center thereof between a die having a convex surface and a mould spaced from said die and having a first cavity adapted to receive said convex surface with a gap therebetween, said die further having a central cavity of generally circular cross-section opening at said convex surface and a pin of a cross-section smaller than the cross-section of said central cavity affixed to said die and extending along said central cavity to define with the wall of said central cavity a first space therebetween, said sheet being positioned so that said aperture is aligned with said opening of said central cavity, clamping said sheet at the periphery thereof, moving said die towards said mould and into engagement with said sheet to plastically deform and impart to said sheet a shape corresponding to the shape of said convex surface, said deformation of said sheet being effected solely by said convex surface, arresting the movement of said die at a position such that said convex surface and the deformed sheet are spaced from the wall of said first cavity, filling the space defined by said deformed sheet and said wall of said first cavity and said first space with a liquid sythetic resin, curing said resin to form a support member for said deformed sheet, said support member having a central hub formed by the cured resin in said first space which extends from the side of said support member adjacent said sheet, withdrawing said die and removing said sheet and support member attached thereto from said mould.

12. The method according to claim 11 wherein at least one side portion of said pin extends parallel to an optical axis of the resultant reflector.

13. The method according to claim 11 including the steps of positioning a pressure plate of a size larger than said aperture in said sheet between said sheet and said mould opposite said aperture and pressing said plate against said sheet so that an end of said pin adjacent said convex surface engages said pressure plate and said pressure plate presses the portion of said sheet adjacent said aperture against said die prior to said filling step, said pressure plate having at least one opening formed therethrough communicating with said first space to permit said liquid resin to flow into said first space.

14. The method according to claim 13 wherein said pressure plate is pressed by a second pin attached to said mould at a position to engage the central portion of said plate.

15. The method according to claim 13 wherein said die has a slot formed in the wall of said central cavity which extends longitudinally of said central cavity and opens at the opening thereof and a detachable insert positioned in said slot, said insert having an transversely extending aperture formed therethrough.

16. The method according to claim 15 including inserting a screw provided with a sheath into said aperture in said insert so that one end of said screw engages said first named pin prior to said filling step.

* * * * *